Dec. 15, 1931. W. TIMSON 1,836,631
AUTOMATIC WEIGHING SCALES
Filed Oct. 26, 1929 3 Sheets-Sheet 1

Inventor:—
William Timson
by George E. Folkes
his Attorney

Dec. 15, 1931. W. TIMSON 1,836,631
AUTOMATIC WEIGHING SCALES
Filed Oct. 26, 1929   3 Sheets-Sheet 3
Fig.3.
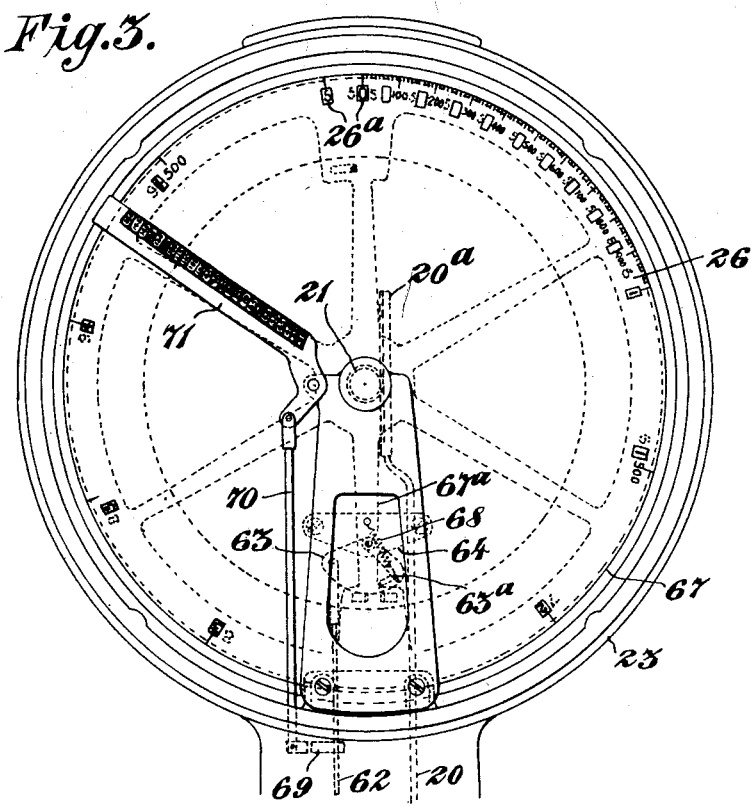
Fig.3.A   Fig.3.B   Fig.3.C
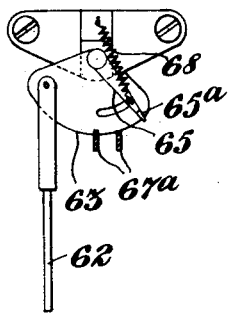 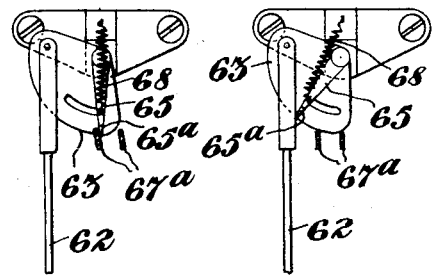
Inventor:—
William Timson
by George E. Folker.
his Attorney Patented Dec. 15, 1931

1,836,631

UNITED STATES PATENT OFFICE

WILLIAM TIMSON, OF SOHO FOUNDRY, BIRMINGHAM, ENGLAND, ASSIGNOR TO W. & T. AVERY LIMITED, OF BIRMINGHAM, ENGLAND

AUTOMATIC WEIGHING SCALES

Application filed October 26, 1929, Serial No. 402,782, and in Great Britain October 31, 1928.

This invention has reference to improvements in or relating to automatic weighing scales and has for its object the provision of an improved construction of automatic weighing scale which is not susceptible to errors of out of level and which, furthermore, permits of a relatively unrestricted view of the scale plate and the ready combination therewith of means for increasing the capacity of the scale when required.

The invention will now be described with particular reference to the accompanying sheet of drawings, wherein:—

Figure 3 is a rear view of the weight indicating mechanism and the housing therefor, Figures 3ᵃ 3ᵇ and 3ᶜ are detail views illustrating the means for changing the major weight graduations of the weight indicating charts according as to whether the capacity weight is in or out of action.

Figure 4 is a detail view illustrating the capacity weight changing mechanism in the out of action position.

In the drawings like numerals of reference indicate similar parts in the several views.

Figure 1:
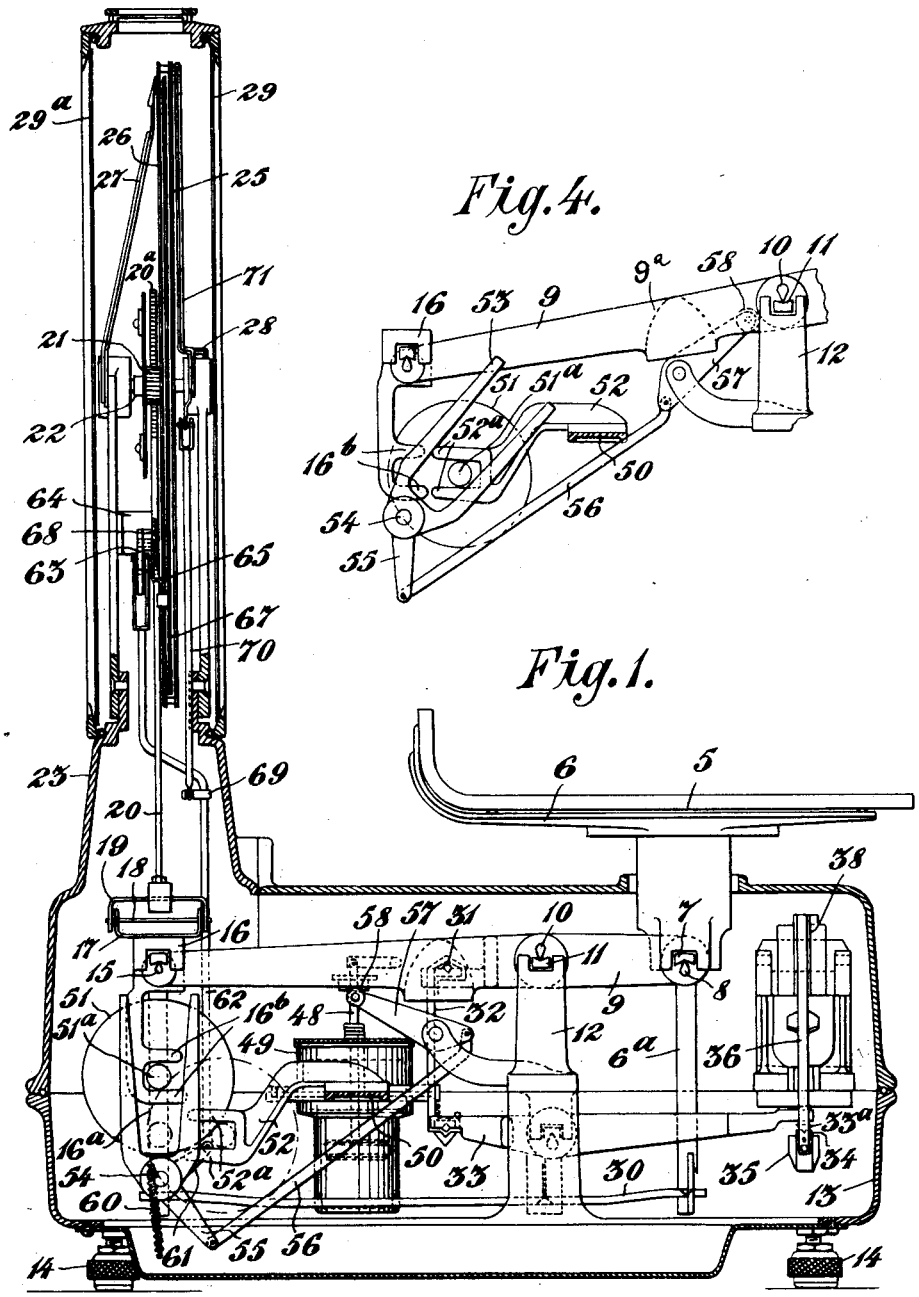
Figure 1 is a part sectional side elevation of a weighing scale constructed in accordance with the invention.
Figure 2:
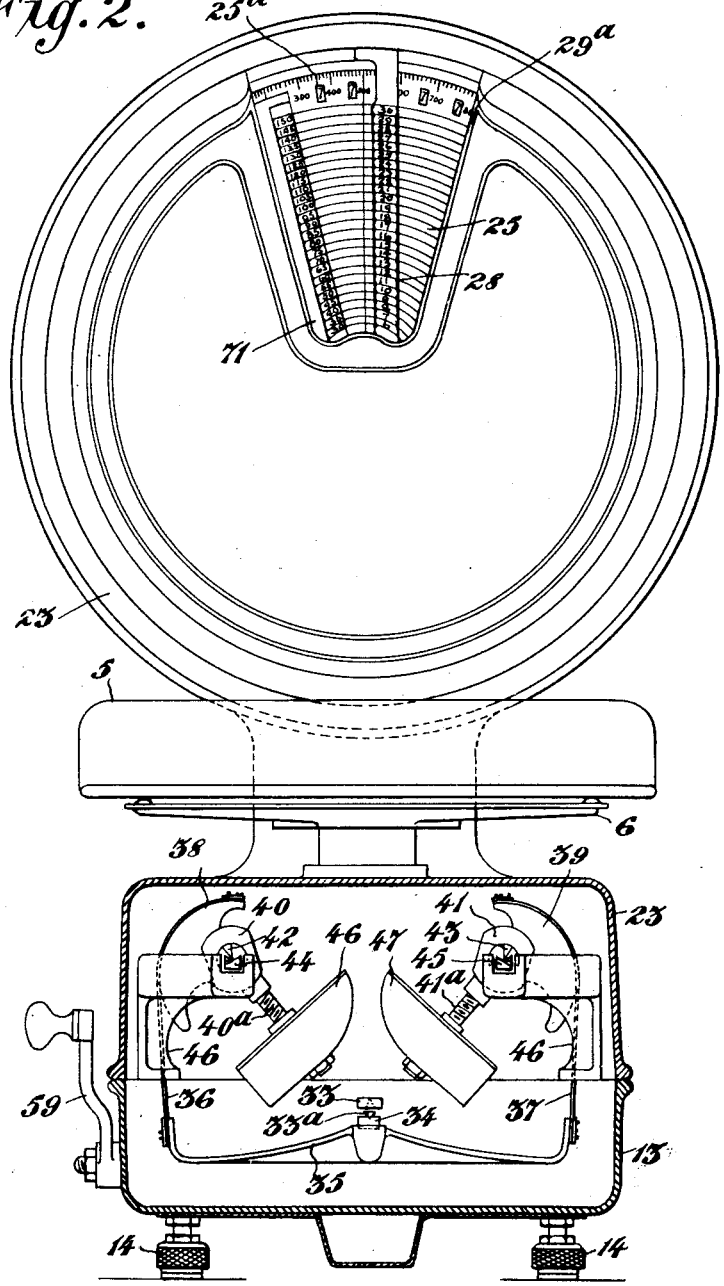
Figure 2 is a part sectional front elevation of the scale seen in Figure 1.

The scale plate 5 is mounted on a spider or support 6 which is provided with bearings 7 adapted to rest on knife-edges 8 carried adjacent to the end of the shorter arm of a lever 9 of the first order constituting the weighbeam. The aforesaid weighbeam 9 is fulcrumed on knife-edges 10 supported in bearings 11 carried by standards 12 supported from a base 13 said base being mounted on adjustable levelling feet 14 in known manner. The other arm of the weighbeam 9 carries adjacent to its end a knife 15 upon which is pivoted a cradle 16. To the upper side of the cradle is secured a link 17 which is pivotally connected by a pin 18 to a link 19 secured to a rod 20. This rod 20 is provided at its upper end with a rack section 20ᵃ adapted to mesh with a pinion 21 fixed on a spindle 22 rotatably mounted in bearings formed in a housing 23 supported on the upper edge of a base housing 13 of an inverted trough shape in cross section and which fits over and rests on the rim of the base 13. Also fixed to the spindle 22 are a pair of interconnected circular graduated weight and price computation charts 25, 26 which register with fixed weight and price indices 27, 28 supported from the housing 23 the weight indications being visible through windows 29, 29ᵃ which form a closure means for the sides of the housing 23.

The support 6 for the scale plate 5 is provided with a downwardly depending leg 6ᵃ which has pivotal connection at its lower end to one end of a check stay 30 which is fulcrumed intermediate its ends on bearings carried by the standards 12 the other arm of the stay 30 having a pivotal connection to a leg 16ᵃ fixed to and depending from the cradle 16.

Depending from a knife-edge 31 carried by the longer arm of the weighbeam 9 adjacent to the fulcrum knife-edge 10 thereof is a link 32 which has a pivotal connection at its lower end to the shorter arm of a lever 33 of the first order which is fulcrumed in bearings carried by the standards 12. This lever 33 is disposed below the longitudinal axis of the outer portion of the weighbeam and its longer arm is provided at the end with a cone point 33ᵃ which rests in a cup 34 secured to the centre of a yoke 35, said yoke 35 being transversely disposed relatively to the weighbeam. The ends of the yoke 35 are cranked upwardly and have clamped thereto the lower ends of a pair of flexible ribbons 36, 37 the upper ends whereof are anchored to the upper ends of the peripheries of a pair of cams 38, 39 which are oppositely disposed relatively to one another and are attached to bosses 40, 41 mounted on knife-edges 42, 43 supported in bearings 44, 45 carried by brackets 46 supported from the base. The bosses 40, 41 are provided with downward and inwardly inclined rods 40ᵃ, 41ᵃ upon which are adjustably mounted pendulous masses 46, 47 in known manner.

The longer arm of the weighbeam 9 has a pivotal connection to the piston rod 48 of a dashpot the cylinder 49 wherefor is supported in a cross bar 50 mounted upon the base.

It is found in practice by reason of the location of the pendulous resistants within the base housing that errors arising from the scale being out of level are minimized the said error being further minimized by the employment of a pair of pendulous resistants which act in opposite directions to one another whereby they tend automatically to rectify errors of level. Furthermore, the location of the pendulous resistants at one end of the weighbeam and the attachment of the rack bar or like mechanism at the other end of the weighbeam enhances the balance of the scale whereby the accuracy and sensitivity of the weighing scale is enhanced.

The construction hereinbefore described lends itself particularly for the addition to the weighbeam of added capacity weights whereby the capacity of the scale may be increased in known manner. For this purpose the sides of the cradle 16 are provided with a pair of inwardly directed jaws $16^b$ adapted to receive the trunnions $51^a$ of a cylindrical capacity weight 51. These trunnions $51^a$ are normally adapted to rest in the jaws $52^a$ of a support 52 bolted to the cross bar 50.

Disposed on each side of the counterweight and adapted to embrace the trunnions but free thereof when the scale is in the weighing position is a vertically disposed fork 53 mounted on a rockable spindle 54 mounted in bearings carried by the base housing 13, one of said forks being formed integral with a crank arm 55 which has connection to one end of a rod 56 the other end whereof is pivotally connected to the shorter arm of a lever 57 fixed on a spindle mounted in bearings supported from the standards 12. The other arm of the lever 57 carries a roller 58 which is adapted to co-operate with a cam $9^a$ carried by the weighbeam 9 as and for a purpose to be set forth hereinafter. The spindle 54 is adapted for actuation by a handle 59 disposed externally of the scale housing. The crank arm 55 is connected to one end of an over-centre spring 60 the other end whereof is anchored to the housing.

Also fixed on the spindle 54 is a second crank arm 61 which is pivotally connected to the lower end of a rod 62 the upper end whereof is connected to one corner of a substantially triangular plate 63 which is pivotally mounted on a bracket 64 supported from the housing 23. Pivoted to the plate 63 is an arm 65 which has a pin and slot connection with the plate 63 and which is provided with a projection $65^a$ adapted to bear strike ears $67^a$ carried by a disc 67 freely mounted on the spindle 22 and disposed between the charts 25, 26 said disc having a pin and slot connection with the charts 25 and 26 and being rotatable therewith. The disc 67 is graduated with two series of the major weight graduations one set corresponding to the normal capacity of the scale and the other set to the capacity of the scale as increased by the capacity weight. The graduations on the disc 67 are visible through windows $25^a$, $26^a$ formed in the charts 25, 26. The arm 65 is controlled by an over-centre spring 68 which tends to maintain the pin on the said arm at one or other end of the slot in the plate 63. When the pin is in the intermediate position the projection $65^a$ is in the path of the ears $67^a$ while it is free of the said ears when in one or other of its extreme positions.

The rod 62 also has a rigid connection with an arm 69 to which is pivotally connected the lower end of a rod 70 the other end whereof is pivotally connected to a crank arm of a multiple price index 71 which is pivotally mounted relatively to the housing and capable of an angular movement about the axis of rotation of the charts 25, 26.

The addition of the capacity weight 51 is effected in the following manner: Upon the rotation of the actuating handle 59 the spindle 54 is rotated and the lever 57 carrying the roller 58 moved to cause the said roller to pass over the surface of the cam $9^a$ and to draw the longer arm of the weighbeam 9 downwardly into a position wherein the jaws $16^b$ on the cradle 16 are disposed opposite to the jaws of the support $52^a$ and which jaws normally support the capacity weight 51. The continued rotation of the spindle 54 causes the fork 53 to roll the capacity weight 51 out of the supporting jaws $52^a$ and into the jaws $16^b$ on the cradle 16. When this movement is completed the roller 58 on the lever 57 is moved free of the weighbeam 9 and the capacity weight 51 allowed to rest freely in the jaws $16^b$ in the depending cradle. Simultaneously with the motion of the forks the rod 62 is moved and caused to rock the plate 63 and through the spring controlled arm 65 and ears $67^a$ to move the disc 67 relatively to the charts 25, 26 so that the graduations of the increased capacity become visible through the gaps $25^a$, $26^a$ in the charts 25, 26. At the same time the movement of the rod 62 through the arm 69 and rod 70 brings the multiple price index 71 into view through the window 29. Under these conditions the monetary value taken from the index 71 is added to the reading on the value chart 25 to give the value of the commodity.

What I claim is:—

1. An automatic weighing scale embodying a weighbeam, a scale plate supported from the weighbeam, a weight indicating mechanism disposed above the scale plate, means for connecting the weighbeam to the weight indicating mechanism, a pair of oppositely acting pendulums disposed below the scale plate and at the opposite end of the weighbeam to that which has connection with the weight indicating mechanism, said pendulums being disposed and adapted to oscillate in a plane at right angles to the weighbeam, a common compensating member connecting the two pendulums and means for connecting the compensating member to the weighbeam.

2. An automatic weighing scale embodying a lever system, a scale plate mounted at one end of the lever system, a weight indicating mechanism disposed above the scale plate, means for connecting the weight indicating mechanism to the lever system, a pendulous resistant mechanism disposed below the scale plate and at the end of the lever system opposite to that which has connection with the weight indicating mechanism, a capacity weight, means carried by the lever system for receiving the capacity weight when required, a support for the capacity weight when in the out of action position and means for transferring the capacity weight from the said support to the means carried by the lever system as and when required.

3. An automatic weighing scale embodying a lever system, a scale plate mounted at one end of the lever system, a weight indicating mechanism disposed above the scale plate, means for connecting the weight indicating mechanism to the lever system, a pendulous resistant mechanism disposed below the scale plate and at the end of the lever system opposite to that which has connection with the weight indicating mechanism, a capacity weight, means carried by the lever system for receiving the capacity weight when required, a support for the capacity weight when in the out of action position, means for ensuring a register between the support and the means carried by the weighbeam and which means is adapted to receive the capacity weight and a rocking member for effecting the transfer of the capacity weight to or from the support to the said means when required.

4. An automatic weighing scale embodying a lever system, a scale plate mounted at one end of the lever system, a weight indicating mechanism disposed above the scale plate, means for connecting the weight indicating mechanism to the lever system, a pendulous resistant mechanism disposed below the scale plate and at the end of the lever system opposite to that which has connection with the weight indicating mechanism, a capacity weight, means carried by the lever system for receiving the capacity weight when required, a support for the capacity weight when in the out of action position, means for ensuring a register between the support and the means carried by the weighbeam and which means is adapted to receive the capacity weight, a rocking member for effecting the transfer of the capacity weight to or from the support to the said means when required and means actuated by the mechanism for controlling the transfer of the capacity weight for changing the major weight numerals of the weight indicating mechanism according as to whether the capacity weight is in or out of action.

5. An automatic weighing scale embodying a lever system, a scale plate mounted at one end of the lever system, a weight indicating mechanism disposed above the scale plate, means for connecting the weight indicating mechanism to the lever system, a pendulous resistant mechanism disposed below the scale plate and at the end of the lever system opposite to that which has connection with the weight indicating mechanism, a capacity weight, means carried by the lever system for receiving the capacity weight when required, a support for the capacity weight when in the out of action position, means for ensuring a register between the support and the means carried by the weighbeam and which means is adapted to receive the capacity weight, a rocking member for effecting the transfer of the capacity weight to or from the support to the said means when required, means actuated by the mechanism for controlling the transfer of the capacity weight for changing the major weight numerals of the weight indicating mechanism according as to whether the capacity weight is in or out of action and a multiple price index adapted to be brought into view or obscured according as to whether the capacity weight is in or out of action.

6. An automatic weighing scale embodying a weighbeam of the first order of levers, a scale pan mounted at one end of the said weighbeam, an auxiliary lever disposed below the weighbeam and having connection with the opposite arm of the weighbeam to that on which the scale pan is supported, a pair of oppositely acting pendulous resistants disposed below the weighbeam and adapted to rock in a plane at right angles to the longitudinal axis of the weighbeam a compensating bar connecting the two resistants, means for connecting the compensating bar to the auxiliary lever, a weight indicating mechanism disposed above the weighbeam, means for actuating the said weight indicating mechanism from the weighbeam said means being connected to that end of the weighbeam which is opposite to that on which the scale pan is mounted and a check stay for preserving the vertical motion of the scale pan.

7. An automatic weighing scale embodying a weighbeam of the first order of levers, a scale pan mounted at one end of the said weighbeam, an auxiliary lever disposed below the weighbeam and having connection with the opposite arm of the weighbeam to that on which the scale pan is supported, a pair of oppositely acting pendulous resistants disposed below the weighbeam and adapted to rock in a plane at right angles to the longitudinal axis of the weighbeam, a compensating bar connecting the two resistants, means for connecting the compensating bar to the auxiliary lever, a weight indicating mechanism disposed above the weighbeam, means for actuating the said weight indicating mechanism from the weighbeam said means being connected to that end of the weighbeam which is opposite to that on which the scale pan is mounted, a check stay for preserving the vertical motion of the scale pan, a capacity weight, means for transferring the capacity weight to and from the weighbeam as required, means for ensuring that the transfer of the capacity weight can only take place when the weighbeam is in a predetermined position, a multiple price index, means for varying the major weight units of the weight indicating mechanism and means connected with the multiple price index and with the major weight unit changing means and with the actuating means for effecting the transfer of the capacity weight so that the operation of changing the major weight units and of bringing into or out of view the multiple price index proceeds simultaneously with the changing of the capacity of the scale.

In testimony whereof I have signed my name to this specification.

WILLIAM TIMSON.